(12) United States Patent
Russ

(10) Patent No.: US 6,202,394 B1
(45) Date of Patent: Mar. 20, 2001

(54) DOWNDRAFT FAN SYSTEM FOR RIDING LAWNMOWER

(76) Inventor: William C. Russ, 5750 Sidney Rd., Belhaven, NC (US) 27810

( * ) Notice: Subject to any disclaimer, the term of this patent is extended or adjusted under 35 U.S.C. 154(b) by 0 days.

(21) Appl. No.: 09/327,643

(22) Filed: Jun. 8, 1999

Related U.S. Application Data

(60) Provisional application No. 60/089,988, filed on Jun. 19, 1998.

(51) Int. Cl.$^7$ .............................. A01D 43/00; B60H 3/06
(52) U.S. Cl. ................................... 56/1; 180/84; 454/158
(58) Field of Search ...................... 56/16.9, 1; 15/250.01; 135/16; 180/84; 296/102, 190.09; 454/189, 137, 158, 136

(56) References Cited

U.S. PATENT DOCUMENTS

| | | |
|---|---|---|
| 624,222 | 5/1899 | Krause et al. |
| 2,230,165 | 1/1941 | Prock. |
| 2,627,217 | 2/1953 | Hainke et al. |
| 2,817,281 | 12/1957 | Schwan et al. |
| 2,860,566 | 11/1958 | Allsup. |
| 3,532,377 * | 10/1970 | Grasseler ........................ 280/190.09 |
| 3,776,358 | 12/1973 | Williams ................................ 180/84 |
| 3,868,896 | 3/1975 | Doll ....................................... 98/2.11 |
| 4,097,085 * | 6/1978 | Nelson ................................... 296/28 |
| 4,739,853 * | 4/1988 | Ogilvie .............................. 180/89.12 |
| 4,995,306 | 2/1991 | Rush ......................................... 98/1 |
| 5,112,535 | 5/1992 | Roberson .............................. 261/27 |
| 5,119,718 | 6/1992 | Wagner ................................. 454/158 |

* cited by examiner

*Primary Examiner*—Robert E. Pezzuto
(74) *Attorney, Agent, or Firm*—Mills Law Firm PLLC

(57) ABSTRACT

A downdraft fan system attachable to a riding lawnmower and other lawn/farm equipment includes a rotary fan within a supporting frame that is attachable to a roll-bar component of the lawnmower so as to be positioned in a horizontal plane directly above the operator of the lawnmower. The downdraft fan system provides a constant flow of ambient air downwardly over the operator of the machine to provide protection from heat exposure, dust, and biting insects while operating the lawnmower. In one embodiment, the downdraft fan system is attachable to a pre-existing roll-bar component of the lawnmower by the use of mounting flanges and suitable attaching hardware. In alternative embodiments, the downdraft fan system is mounted in a modified supporting frame that is attachable to the frame of riding lawnmowers lacking a roll-bar component or to the roof structure of a forklift and other similar equipment.

4 Claims, 3 Drawing Sheets

DOWNDRAFT FAN SYSTEM FOR RIDING LAWNMOWER

CROSS-REFERENCE TO RELATED APPLICATION

This Application claims the benefit under 35 U.S.C. 119(e) of U.S. Provisional Application No. 60/089,988 filed Jun. 19, 1998 by William C. Russ for Riding Mower Downdraft Fan System.

BACKGROUND OF INVENTION

1. Field of Invention

The present invention relates generally to lawn/farm equipment and, more particularly, to a rotary downdraft fan system for attachment to such equipment for operator comfort.

So-called riding lawnmowers and related lawn/farm vehicles are well known to those skilled in the art. A riding lawnmower becomes a practical necessity to a landowner who has substantial acreage in a lawn which must be mowed and maintained.

Such a riding mower offers the operator little in the way of protection from exposure to sun, heat, dust, and insects which become troublesome to the driver after an extended period of operation.

Thus, the present invention has been developed to provide a constant downdraft of fresh air over the operator of a riding lawnmower or other similar equipment to provide relief from the heat, dust, and insects.

2. Description of Related Prior Art

U.S. Pat. No. 2,817,281 to Joseph F. Schwan et al discloses an air-circulating parasol for a farm vehicle for protection against dust, insects and sun. This device includes a fan driven by an electric motor which is mounted above the drivers head in a circular hood structure, which produces circulation of air downwardly in a vortex that effectively shields the driver from dust, dirt, flying insects and even light rain.

U.S. Pat. No. 5,119,718 to Jurgen Wagner et al discloses a ventilating arrangement for the cab of a vehicle which draws air in from outside the cab and through the cab roof. The air flows through at least one generally vertical air duct downward to the vicinity of the cab floor and is supplied from there to various outlets in the interior of the cab. However, this invention does not provide a downward flow of air directly onto the head and shoulders of the driver of the vehicle.

U.S. Pat. No. 3,868,896 to Robert M. Doll et al discloses a vehicle cab enclosure having a forced air ventilation system including a horizontally arranged intake and filter. The ventilation system also includes a central air plenum chamber connected to a blower with a pair of side chambers having vents into the cab interior. Because this system is designed for a cab enclosure, it does not produce a downward flow of air directly over the driver to protect against sun, dust, and insects.

U.S. Pat. No. 3,776,358 to Cyril G. Williams discloses an operator cab for farm vehicles for the suppression and control of dust while furnishing adequate ventilation and cooling and assuring good visibility by directing continuous streams of air over the exterior surfaces of all windows. The cab features hollow walls at the sides and rear and an overhead fan compartment with ventilation controls.

U.S. Pat. No. 2,860,566 to Walter L. Allsup et al discloses a protecting device for vehicle operators featuring a motor driven fan mounted in a canopy which is positioned above the head of the driver and arranged for taking in air from a substantial distance above the canopy where it is comparatively free from dust and blowing such clean air downwardly around the operator while seated to keep the operator cool and free from dust, debris and the like.

U.S. Pat. No. 2,230,165 to William P. Prock discloses a fan attachment designed for use on farm vehicles comprising a fan mounted to be driven from a ground wheel of the vehicle for creating a draft of air to carry dust away from the operator of the vehicle. In this invention a fan is attached at one end of a vertically disposed drive shaft. An opposite end of the shaft is driven by a gear mechanism at the rear wheel of the vehicle.

U.S. Pat. No. 4,995,306 to Robert E. Rush discloses an air circulating system for a person operating an engine powered piece of agricultural equipment which consists of a fan rotatably carried within a housing having an air inlet port and an air outlet port. An elongated duct is connected to the outlet port of the housing for directing air driven by the fan towards the person operating the equipment to afford a degree of comfort during hot days.

U.S. Pat. No. 5,112,535 to Joe E. Roberson discloses an apparatus for providing cooled air to the occupant of a compartment of a vehicle such as a golf cart. Such an apparatus includes a water recirculating system including a filter means, a pumping means for pumping water through the filter means, drawing means for passing warm or hot air through the filter means and blower means for blowing cooled air into the compartment.

U.S. Pat. No. 2,627,217 to Oscar T. Hainke et al discloses a protecting hood for implement drivers including an umbrella-like assembly mounted on a upright standard above the head of an operator of farm equipment. The umbrella-like structure is provided with a rotary fan for directing a current of air downwardly around the machine operator.

Finally, U.S. Pat. No. 624,222 to Theodore Krause et al discloses a fan attachment for conveyances such as a baby carriage wherein a rotary fan is driven by a gear mechanism connected to the rear wheels of the carriage. A belt and pulley arrangement extends from the gear driven mechanism upwardly through the carriage structure to rotate the fan which blows air downwardly over the infant in the carriage.

SUMMARY OF THE INVENTION

After much study of the above problem, the present downdraft fan system has been developed to provide a constant downdraft of air over the operator of a riding lawnmower or other lawn/farm equipment to provide the operator with protection from the heat, dust and biting insects.

The present invention provides a rotary fan which is mounted within a peripheral frame and is secured to the roll-bar structure of the riding mower, which is designed to protect the operator in the event the mower is toppled over.

The rotary fan is disposed in a horizontal plane above the machine operator and is designed to provide a continuous flow of ambient air downwardly over the operator while the machine is in operation. The downdraft of air simultaneously cools the operator, suppresses any upward flow of dust and debris, and repels biting insects.

From the above, it is an object of the present invention to provide a downdraft fan system including a horizontally mounted, rotary fan for attachment to the roll-bar component of lawn/farm equipment such as a riding lawnmower.

Another object of the present invention is to provide a downdraft fan system which will protect an operator of such equipment from the effects of heat, dust, and biting insects while the machine is in operation.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
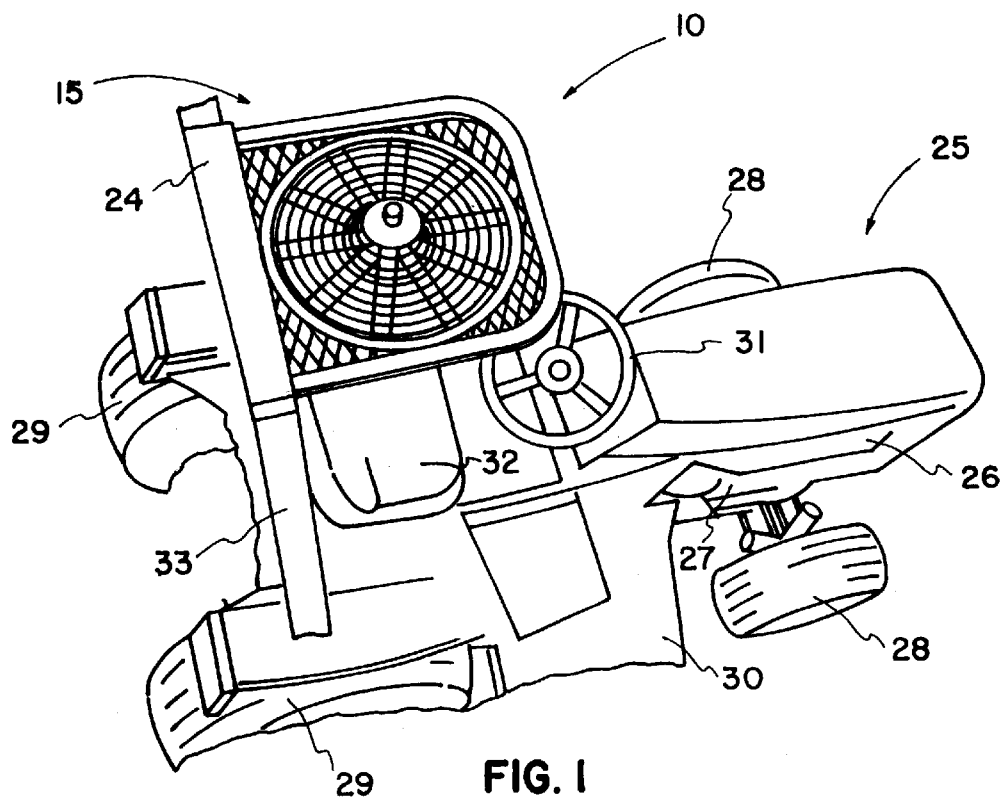
FIG. 1 is a top perspective view of a riding lawnmower showing the downdraft fan system installed thereon.

With reference to the drawings there is shown therein a downdraft fan system in accordance with the present invention, illustrated in FIG. 1 and indicated generally at 10.

Prior to discussing the construction of the present invention in detail, it may be beneficial to briefly review the structure and function of a riding lawnmower, indicated generally at 25, whereon the present invention is utilized. Such a riding mower 25 is a self-powered vehicle having an engine compartment 26 mounted on a frame 27 transported by front and rear wheels 28 and 29 in a known manner.

A cutting blade (not shown) is enclosed within a safety shroud 30 and driven at high speed to mow the lawn.

The operator (not shown) is seated at the steering wheel 31 in a driver's seat 32 which is disposed adjacent a so-called roll-bar 33 designed to protect the operator in event the mower 25 is toppled over.

The mower 25 includes an onboard electrical power system including circuitry and components sufficient to provide the electrical functions of the mower.

A riding lawnmower of a type manufactured by the John Deere Corporation and other similar manufacturers is well-suited for use with the present invention.

Although the present downdraft fan system 10 will be described for use on such a riding lawnmower, it will be appreciated that the present invention may also be adapted to other similar vehicles such as farm tractors, skip loaders, and other vehicles wherein the operator is exposed to the elements.

Figure 2:
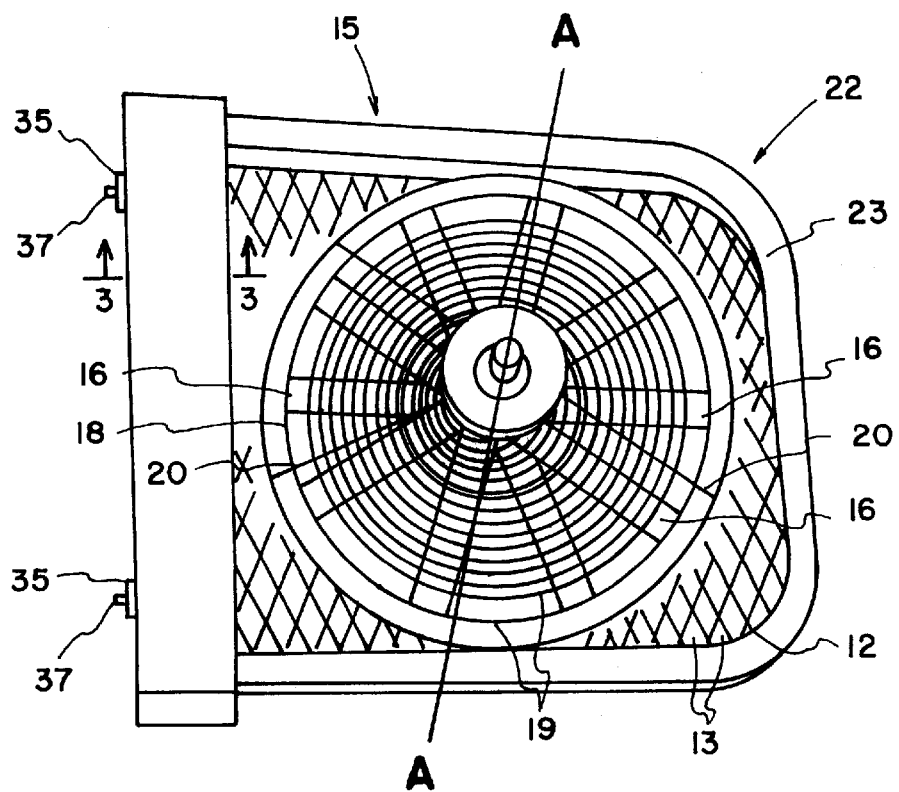
FIG. 2 is a top perspective view showing the rotary fan of the present system disposed within a peripheral frame.

Referring now to FIG. 2 the present downdraft fan system 10 includes a rotary fan, indicated generally at 15 having a plurality of blades 16 which are driven by an electric motor 17 about an axis of rotation A as shown in FIG. 2.

The blades 16 and the motor 17 are mounted within a generally dome-shaped wire screen 18 which is radially disposed about the blades 16 and extends axially beyond the blades 16 to enclose the fan 15.

As shown in FIG. 2 the screen 18 includes a plurality of concentric strands 19 which are interconnected by a plurality of radial braces 20 and being joined at the interstices thereof by weldment.

The fan 15 is supported in position above the driver's seat 32 within a peripheral support frame, indicated generally at 22. Frame 22 includes a generally U-shaped member 23 constructed of cylindrical steel tubing and bent at the corners thereof to the configuration shown in FIG. 2. The ends of the tubular member 23 are interconnected with a rectangular tubing member 24 being attached thereto by weldment or other attaching hardware.

A generally rectangular sheet of expanded metal 12 defining openings 13 therein is attached to the frame 22 by weldment or other attaching hardware to provide a rigid, horizontal surface whereon the fan 15 is mounted in its functional position.

Since such expanded metal is well known to those skilled in the art, further detailed discussion of the same is not deemed necessary.

Figure 3:
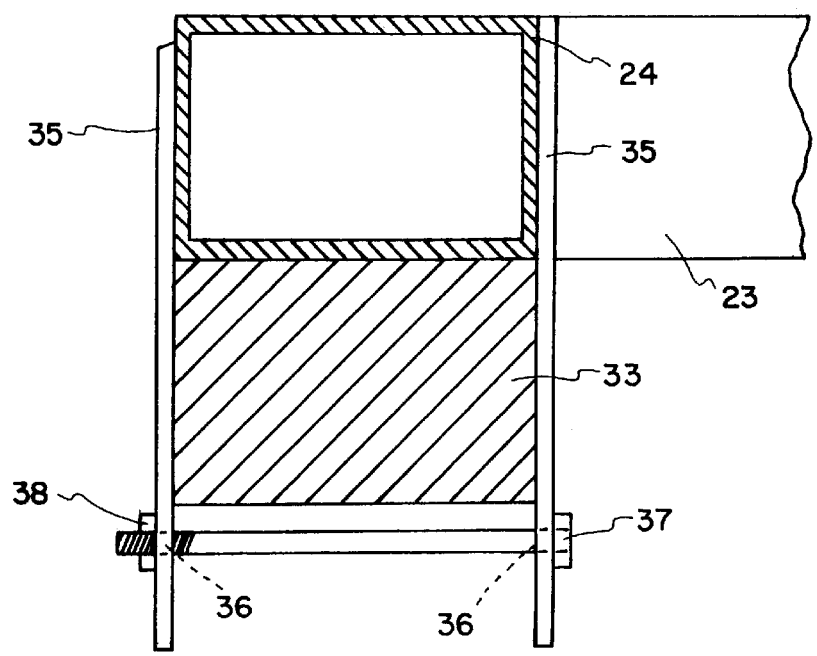
FIG. 3 is a sectional view taken along line 3—3 of FIG. 2 showing the attachment hardware required for securing the rotary fan housing in position on the roll-bar.

Once assembled as shown in FIG. 2, the downdraft fan system is secured to the horizontal portion of the roll-bar 33 as more clearly shown in FIG. 3. A plurality of pairs of downwardly projecting flanges 35 are secured to tubing 24 by weldment or other attaching hardware. A pair of coaxial holes 36 are formed in the opposed flanges 35 to permit the insertion of a machine bolt 34 which is secured therein by lock nut 38.

Thus, in an installation procedure for this embodiment, the fan system 10 is guided into position such that the flanges 35 are disposed over the roll-bar 33 and secured in position by the machine bolt 37 as shown in FIG. 3.

It will be appreciated by those skilled in the art that this installation procedure requires no modification of the roll-bar 33 which would invalidate the user's warranty for safety and product liability reasons.

Figure 4:
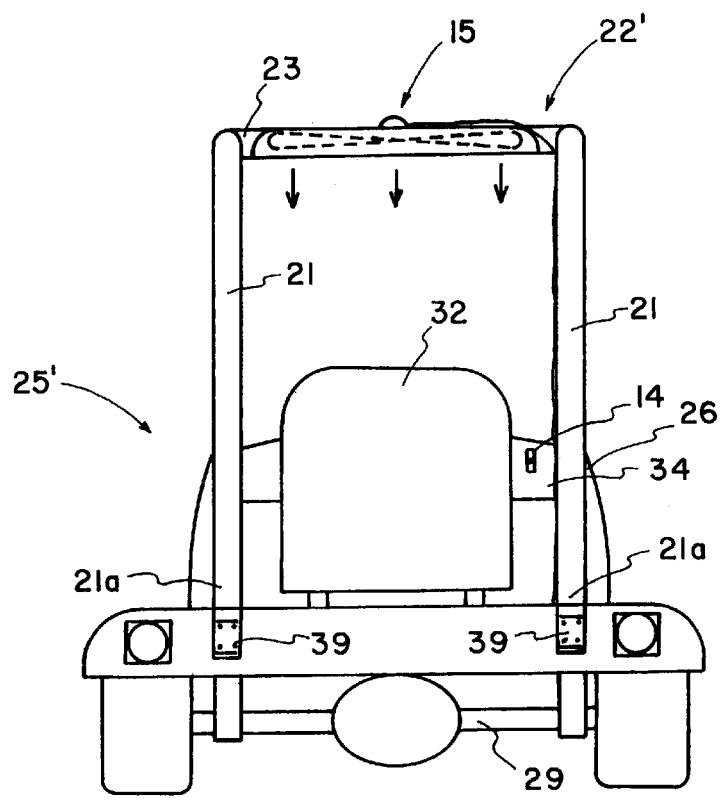
FIG. 4 is a rear elevational view of an alternative embodiment of the downdraft fan system mounted on a modified support frame.

In an alternative embodiment, the downdraft fan system may be installed on the riding mower 25 using a modified support frame 22' as shown in FIG. 4. In this embodiment the support frame 22' includes a pair of parallel, upright members 21 integrally formed with the U-shaped member 23 for attachment to a riding mower 25' which is not provided with a roll-bar 33 as standard equipment. A cross-member (not shown) fabricated from steel tubing extends between the upright members at the upper ends thereof to reinforce this version of the frame 22'.

The support frame 22' is fabricated by the use of a steel tubing bender (not shown) to the required dimensions.

In this embodiment the upright members 21 are mechanically attached to frame 27 of the mower 25' by the use of right-angularly bent brackets 39 which engage the open ends 21a of the upright members 21.

Figure 5:
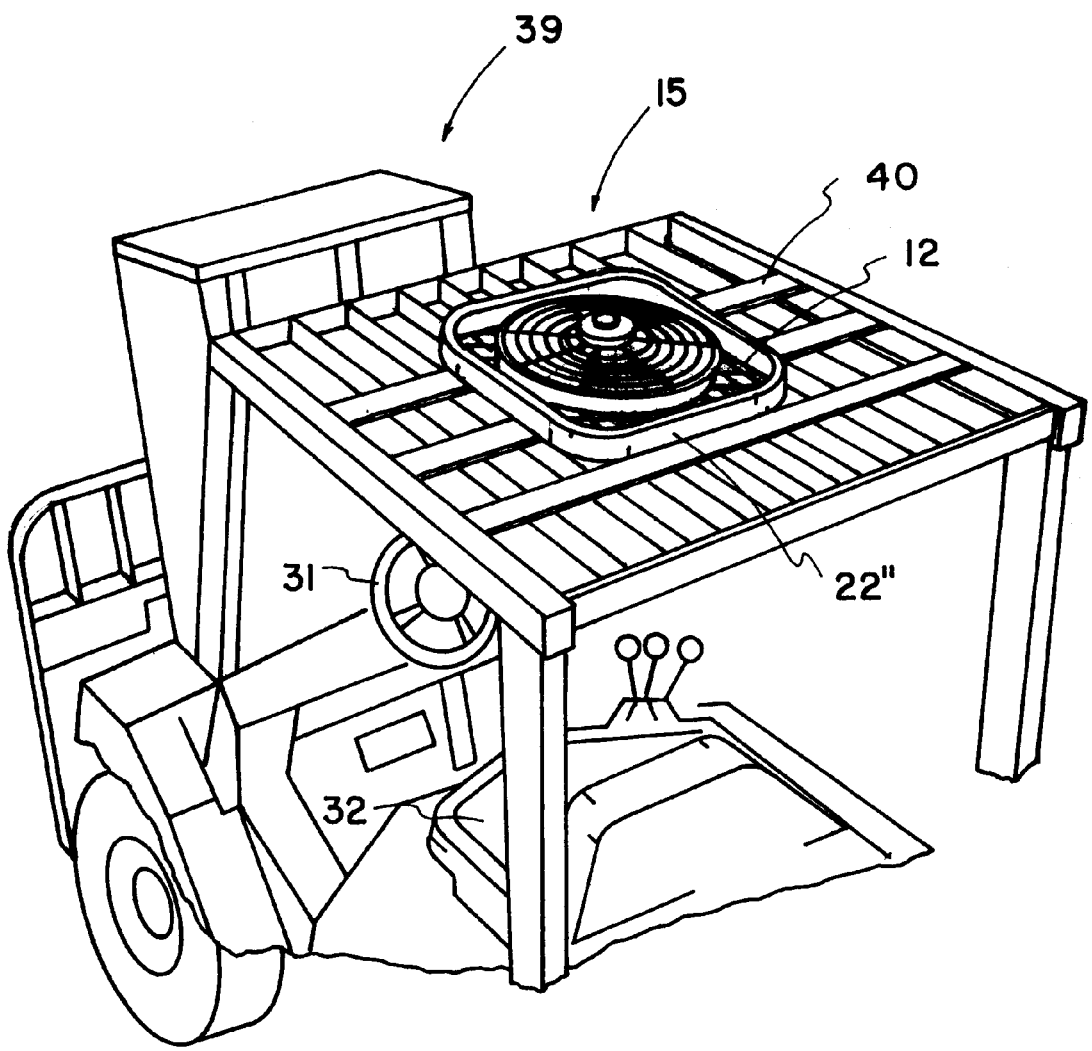
FIG. 5 is a partial perspective view of a forklift truck with the present fan system mounted on the roof structure thereof.

In yet another alternative embodiment shown in FIG. 5 the rotary fan 15 can be adapted to a fork lift, indicated generally at 39 or other equipment having a so-called Bimini top or roof structure 40 which provides protection for the operator. In this version the fan 15 mounted in a modified peripheral frame 22" is simply attached to the roof structure 40 being secured thereon using suitable attaching hardware.

In any case, the rotary fan 15 is electrically connected to a 12 volt power source of the riding mower 25, forklift 39, or other similar vehicle. An inline switch 14 may be added on the control console 34 for the convenience of the operator.

The present downdraft fan system provides a continuous downward flow of air over the operator when the mower is in use thereby protecting the operator from heat, dust, and insects which are troublesome during extended periods of operation.

The present downdraft fan system is easily installed on riding lawnmowers and other similar vehicles from various manufacturers with minimal modification of the original equipment.

The terms "upward", "downward", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. In a riding lawnmower having a power supply and a generally inverted U-shaped protective frame member including a horizontal arm extending vertically above and located rearwardly of a driving position for an operator, a downdraft fan system for cooling the operator comprising:

a generally rectangular tubular supporting frame defining a central vertical opening;

attaching means for connecting said supporting frame to said horizontal arm above said driving position;

a generally rectangular apertured panel having a circular opening and peripherally connected to said supporting frame;

a protective screen disposed above said circular opening and connected to said apertured panel; and a rotary fan disposed within said circular opening below, carried by said protective screen, and operatively connected to said power supply.

2. The downdraft fan system as recited in claim 1 wherein said apertured panel is expanded metal and peripherally connected to said supporting frame by weldments.

3. The downdraft fan system as recited in claim 2 wherein said attaching means includes spaced clamping flanges for releasably connecting said support frame to said protective frame member.

4. The downdraft fan system as recited in claim 2 wherein said protective frame member is a roll bar integrally connected with said riding lawnmower rearward of said driving position.

* * * * *